(12) United States Patent
Goodhue et al.

(10) Patent No.: US 7,305,543 B2
(45) Date of Patent: Dec. 4, 2007

(54) MEMORY ORGANIZATION ALLOWING SINGLE CYCLE POINTER ADDRESSING WHERE THE ADDRESS OF THE POINTER IS ALSO CONTAINED IN ONE OF THE MEMORY LOCATIONS

(75) Inventors: Gregory Goodhue, San Jose, CA (US); Ata Khan, Saratoga, CA (US); Zhimin Ding, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/566,514

(22) PCT Filed: Jul. 27, 2004

(86) PCT No.: PCT/IB2004/051302

§ 371 (c)(1),
(2), (4) Date: Jan. 30, 2006

(87) PCT Pub. No.: WO2005/010743

PCT Pub. Date: Feb. 3, 2005

(65) Prior Publication Data

US 2006/0206691 A1    Sep. 14, 2006

Related U.S. Application Data

(60) Provisional application No. 60/490,954, filed on Jul. 30, 2003.

(51) Int. Cl.
*G06F 9/00* (2006.01)
(52) U.S. Cl. .................................................. 712/220
(58) Field of Classification Search ................. 712/32, 712/38, 228, 220, 225
See application file for complete search history.

(56) References Cited

U.S. PATENT DOCUMENTS

| | | | | |
|---|---|---|---|---|
| 4,245,302 | A | * | 1/1981 | Amdahl ...................... 712/243 |
| 4,926,312 | A | * | 5/1990 | Nukiyama ................... 712/219 |
| 5,179,716 | A | * | 1/1993 | Agrawal et al. ............... 712/38 |
| 6,058,467 | A | * | 5/2000 | Broxterman et al. .......... 712/32 |
| 6,098,160 | A | | 8/2000 | Drake |
| 6,131,108 | A | * | 10/2000 | Born et al. .................. 708/670 |
| 2002/0042869 | A1 | | 4/2002 | Tate |
| 2002/0103979 | A1 | | 8/2002 | Koga |
| 2003/0028754 | A1 | | 2/2003 | Sugimoto |

* cited by examiner

*Primary Examiner*—Richard L. Ellis
*Assistant Examiner*—Vincent Fong
(74) *Attorney, Agent, or Firm*—Peter Zawilski

(57) ABSTRACT

All pointer-based accesses require first that the value contained in a pointer register to be read and then that value be used as an address to the appropriate region in random access memory (RAM). As implemented today, this requires two memory read access cycles, each of which takes at least one clock cycle and therefore this implementation does not allow single cycle operation. In accordance with an embodiment of the invention, when an access is performed to pointer memory to read the contents of a pointer, it is the shadow memory that is actually read and that returns the pointer value. Since the shadow memory is made up of pointer registers, a read access involves multiplexing out of appropriate data for the pointer address from these pointer registers to form a target pointer address. This target pointer address is then used as an address to access RAM without the overhead of a clock, since the register access is purely combinatorial and does not require clock-phase related timing as does access to the RAM.

10 Claims, 4 Drawing Sheets

MEMORY ORGANIZATION ALLOWING SINGLE CYCLE POINTER ADDRESSING WHERE THE ADDRESS OF THE POINTER IS ALSO CONTAINED IN ONE OF THE MEMORY LOCATIONS

CROSS REFERENCE TO RELATED APPLICATION

This application claims the benefit of U.S. provisional application Ser. No. 60/490,954 filed Jul. 30, 2003 which is incorporated herein in whole by reference.

The invention relates to the field of microcontroller memory organization and more specifically to the field of memory organization that facilitates access using reduced clock cycles.

Generally, for 8051 microcontrollers, known to those of skill in the art, there are two different sets of memory. One is an instruction memory for storing of instruction data for execution by a processor and the other is a data memory for storing and retrieving of data for use by the instructions. Some of the instructions that are processed by the microcontroller are pointer based instructions. The microcontroller, in executing of these instructions, reads a first pointer address that is used for accessing of a first memory location. Typically, the pointer address is indicative of the first memory location or of an offset to the first memory location. At the first memory location, a second pointer address is stored. This second pointer address is read by the processor to access data stored at a second memory location, which is pointed to by the second pointer address. In completing the pointer based memory access cycle, the processor uses two memory access operations in order to retrieve the data, where both of these memory access operations are clock dependent and as a result, the execution time of the pointer based instruction is dependent upon the clock frequency and the speed of the memory within which the first and second memory locations are found.

In order to decrease processing time and in order to decrease power consumption of microcontrollers, a decrease in instruction execution time as well as a decrease in memory access operations are preferred. A need therefore exists for providing a microcontroller architecture that allows for single clock cycle data memory access operations. It is therefore an object of the present invention to provide a microcontroller architecture that facilitates pointer memory access operations in a single clock cycle.

In accordance with the invention there is provided a microcontroller architecture comprising: a processor for processing of instruction data comprising memory access instructions for accessing of a memory circuit; at least a pointer memory circuit for storing of a pointer address forming part of the instruction data; at least a pointer register for storing a duplicate of the pointer address; and, a control circuit for determining whether one of a read operation from the at least a pointer memory circuit and a write operation to the at least a pointer memory circuit is to take place, wherein for a write operation the control circuit stores the pointer address in the at least a pointer memory and automatically stores a duplicate in the at least a pointer register and where for a read operation the control circuit utilizes the at least a pointer register to access data pointed to by a target pointer address derived from the pointer address stored therein and other than accesses the at least a pointer memory.

In accordance with the invention there is provided a method of pointer based addressing comprising the steps of: providing at least a pointer memory; providing at least a pointer register; storing of a pointer address data in the at least a pointer memory; and, upon storing of a pointer address data in the at least a pointer memory, automatically storing a duplicate pointer address data, which is a duplicate of the pointer address data, in the at least a pointer register.

In accordance with the invention there is provided a storage medium having data stored thereon, the data for implementation of a processing system comprising: first instruction data for providing at least a pointer memory; second instruction data for providing at least a pointer register; third instruction data for upon storing of a pointer address in the at least a pointer memory, automatically storing a duplicate pointer address, which is a duplicate of the pointer address, in the at least a pointer register; fourth instruction data for receiving a memory access request to a memory location within a memory for retrieving of data stored at the memory location addressed by the pointer address; fifth instruction data for retrieving of the duplicate pointer address from the at least a pointer register; and, sixth instruction data for accessing the memory using a target pointer address derived from the duplicate pointer address and other than using a target pointer address derived from the pointer address stored in the at least a pointer memory.

Exemplary embodiments of the invention will now be described in conjunction with the following drawings, in which.

Figure 1:
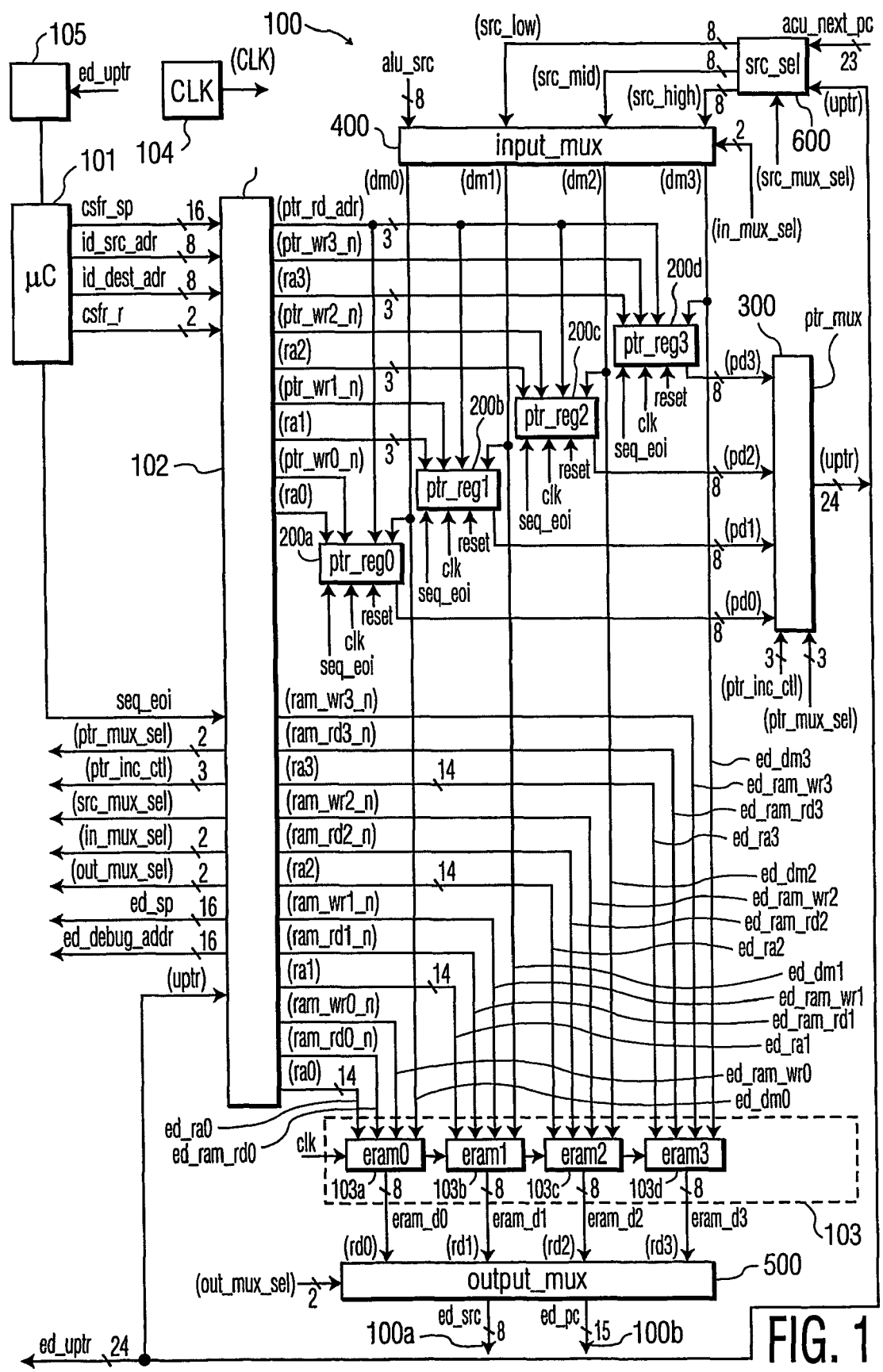
FIG. 1 illustrates an EDATA access logic block in accordance with a preferred embodiment of the invention.

FIG. 1 illustrates a 80C51 MX1 core® microcontroller architecture for manufacturing by Philips semiconductors, comprising an extended data (EDATA) random access memory (RAM) access logic block (EDATA access logic block) 100 in accordance with a preferred embodiment of the invention. A processor 101 is disposed external to the EDATA access logic block 100 and coupled therewith for providing processing resources. Four RAM circuits (ERAMs) 103a through 103d, are disposed external to the EDATA access logic block 100, where the ERAMs 103a through 103d are used for implementing of the pointer memory used for accessing of EDATA RAM 105. A clock circuit 104 provides a clock signal (clk) to circuit blocks disposed within the EDATA access logic block 100, as well as to the EDATA RAM 105 and to the ERAMs 103.

Disposed within the EDATA access logic block 100 is a control block 102, four pointer registers 200a through 200d, an input MUX block 400, an output MUX block 500, a pointer MUX block 300, and a source select block 600. . The EDATA access logic block 100 is for accessing of the EDATA RAM 105. The functions of each of these blocks will be better understood with a review of their input signals and output signals and respective figure, as is described in more detail hereinbelow. Table 1 summarizes the input signals provided to the control block 102 from the processor 101.

The seq_eoi input signal is dependent upon an end of instruction flag from the processor. This input signal is used to determine when to write data to the ERAMs, 103a through 103d, and to the pointer registers, 200a through 200d.

Table 2 is a summary of the output signals provided from the control block 102 to the pointer registers 200a through 200d and to the ERAMs 103a through 103d.

TABLE 1

Input signals provided to the control block.

| Name | Direction | Width | Function |
|---|---|---|---|
| csfr_sp | IN | 16 | Stack Pointer current value. |
| csfr_rs | IN | 2 | Bank select bits (RS1, RS0). |
| id_src_adr | IN | 8 | The1 data source address for the current instruction, if it is of type Rn, Ri, PRi, direct, or bit. |
| ld_dest_adr | IN | 8 | The data destination address for the current instruction, if it is of type Rn, Ri, PRi, direct, or bit. |
| seq_eoi | IN | 1 | End of instruction flag, used to determine when to write data to the ERAM and pointer register blocks. |

TABLE 2

Control block output signals to the pointer registers and to the ERAMs

| Name | Direction | Width | Function |
|---|---|---|---|
| ra0 | OUT | 14 | Read and write address for eram0. |
| ra1 | OUT | 14 | Read and write address for eram1. |
| ra2 | OUT | 14 | Read and write address for eram2. |
| ra3 | OUT | 14 | Read and write address for eram3. |
| ram_rd0_n | OUT | 1 | Read strobe for eram0. |
| ram_rd1_n | OUT | 1 | Read strobe for eram1. |
| ram_rd2_n | OUT | 1 | Read strobe for eram2. |
| ram_rd3_n | OUT | 1 | Read strobe for eram3. |
| ram_wr0_n | OUT | 1 | Write strobe for eram0. |
| ram_wr1_n | OUT | 1 | Write strobe for eram1. |
| ram_wr2_n | OUT | 1 | Write strobe for eram2. |
| ram_wr3_n | OUT | 1 | Write strobe for eram3. |
| ptr_rd_adr | OUT | 3 | Pointer register read address. |
| ptr_wr0_n | OUT | 1 | Write strobe for ptr_reg0. |
| ptr_wr1_n | OUT | 1 | Write strobe for ptr_reg1. |
| ptr_wr2_n | OUT | 1 | Write strobe for ptr_reg2. |
| ptr_wr3_n | OUT | 1 | Write strobe for ptr_reg3. |

The read and write address signals, ra0 through ra3 are provided both to the respective ERAMs, 103a through 103d, and to the respective pointer registers, 200a through 200d. Thus, the read and write address signal ra0 is provided to the first ERAM 103a and to the first pointer register 200a, the ra1 signal is provided to the second ERAM 103b and to the second pointer register 200b, the ra2 is provided to the third ERAM 103c and to the third pointer register 200c, and the ra3 signal is provided to the fourth ERAM 103d and to the fourth pointer register 200d. The read strobe signals, ram_rd0_n through ram_rd4_n, and the write strobe signals ram_wr0_n through ram_wr4_n, are only provided to the respective ERAMs. The pointer registers 200a through 200d, are provided with a respective write strobe signal, ptr_wr0_n through ptr_wr3_n, and a same pointer register read address signal, ptr_rd_adr.

TABLE 3

Output signals provided from the control block to other circuit blocks forming the EDATA access logic block

| Name | Direction | Width | Function |
|---|---|---|---|
| in_mux_sel | OUT | 2 | Controls the input data mux. |
| out_mux_sel | OUT | 2 | Controls the output data mux. |
| ptr_inc_ctl | OUT | 3 | Controls the pointer incrementer. |
| src_mux_sel | OUT | 1 | Controls the data select mux. |
| ptr_mux_sel | OUT | 3 | Controls the pointer mux. |

The output signals summarized in Table 3 that are provided from the control block are used to control other circuit blocks within the EDATA access logic block 100, as will be apparent when the functions of these circuit blocks are discussed in more detail hereinbelow.

Figure 2:
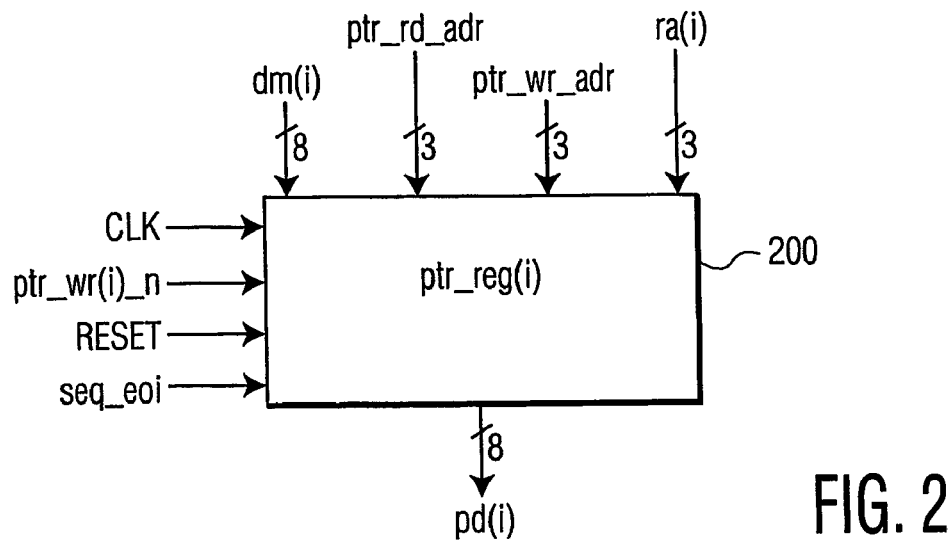
FIG. 2 illustrates a single pointer register block, where for the architecture shown in FIG. 1, this pointer register block is implemented four times as first through fourth pointer registers.

FIG. 2 illustrates a single pointer register block 200, where for the architecture shown in FIG. 1, this pointer register block is implemented four times as pointer registers 200a through 200d. Each pointer register block preferably stores eight bytes of data, which are used to mirror banked registers R0 through R7 that are stored in the ERAMs 103a through 103d. A first pointer register block stores all four register banks of registers R0 and R4, a second pointer register block stores all four register banks of registers R1 and R5, a third pointer register block stores all four register banks of registers R2 and R6, and a fourth pointer register block stores all four register banks of registers R3 and R7. Data, dm0 through dm3, is input into each pointer register block, 200a through 200d, which is the same data as for the corresponding ERAM block from the ERAMs 103a through 103d. A pointer read address is provided from the id_src_adr or id_dest_adr signals, as received by the control block 102. Input and output signals to and from the single pointer register block are summarized in Table 2.

TABLE 4

Summary of input and output signals provided to and from the single pointer register block

| Name | Direction | Width | Function |
|---|---|---|---|
| dm(i) | IN | 8 | Input data to the pointer register. This is the same data received by the corresponding ERAM block. |
| ptr_rd_adr | IN | 3 | Pointer register read address. |
| ptr_wr_adr | IN | 3 | Pointer register write address. |
| ra(i) | IN | 3 | Three bits of the ERAM read and write address. |
| clk | IN | 1 | CPU clock input. |
| reset | IN | 1 | Chip reset input. |
| ptr_wr(i)_n | IN | 1 | Write strobe for the pointer register. |
| seq_eoi | IN | 1 | End of instruction flag, which is used to determine when write data to the registers. Seq_eoi is asserted while wr_n is low for a write to occur at the next rising edge of clk. |
| pd(i) | OUT | 8 | Output data from the pointer register. Data from the pointer register corresponding to the current value of ptr_rd_addr is output continuously. |

Output signals pd0 through pd3 are provided from the pointer registers to four input ports disposed on the pointer MUX 300.

Figure 3:
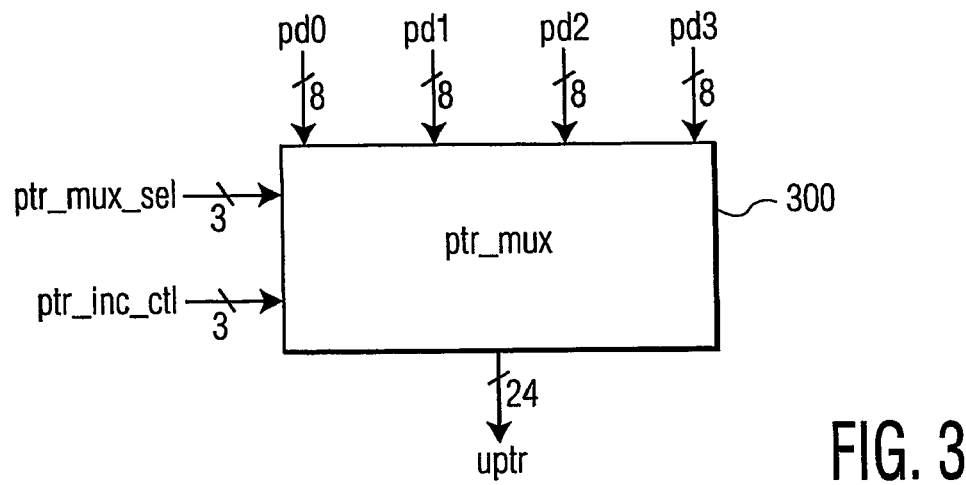
FIG. 3 illustrates a pointer multiplexer (MUX) block for receiving of data signals from each of the pointer registers.

FIG. 3 illustrates the pointer multiplexer (MUX) block 300. Input and output signals provided to and from the pointer multiplexer (MUX) block are summarized in Table 5. The pointer MUX block receives data signals, pd0, pd1, pd2, and pd3 from each of the pointer registers, 200a through 200d. Within this block, selection is performed of the pointer register output data that are to be used for indirect memory addressing operations. Furthermore, offsets in the pointer register data take place within the pointer MUX block 300 in order to make offset adjustments to universal pointer values. The ed_uptr output signal, or target pointer address, is either the sum of a universal pointer value and an offset, which is 2-bit immediate data, or an 8-bit pointer register value padded with zeroes to have a length of 24-bits, as determined by the ptr_mux_sel signal received from the control block. The target pointer address is used during indirect memory access operations, where this target pointer address is provided to both the control block 102 and to an input port disposed on the source select block 600.

TABLE 5

Summary of input and output signals provide to and from the pointer multiplexer (MUX) block

| Name | Direction | Width | Function |
|---|---|---|---|
| pd0 | IN | 8 | data from ptr_reg0 |
| pd1 | IN | 8 | data from ptr_reg1 |
| pd2 | IN | 8 | data from ptr_reg2 |
| pd3 | IN | 8 | data from ptr_reg3 |
| ptr_mux_sel | IN | 3 | Controls the pointer mux, selecting between an 8-bit, zero-padded pointer value, and a 24-bit universal pointer value. |
| ptr_inc_ctl | IN | 3 | Controls the pointer increment value during EMOV and ADD PRI, #data2 instructions. |
| ed_uptr | OUT | 24 | Pointer target address during indirect operations. |

Figure 4:
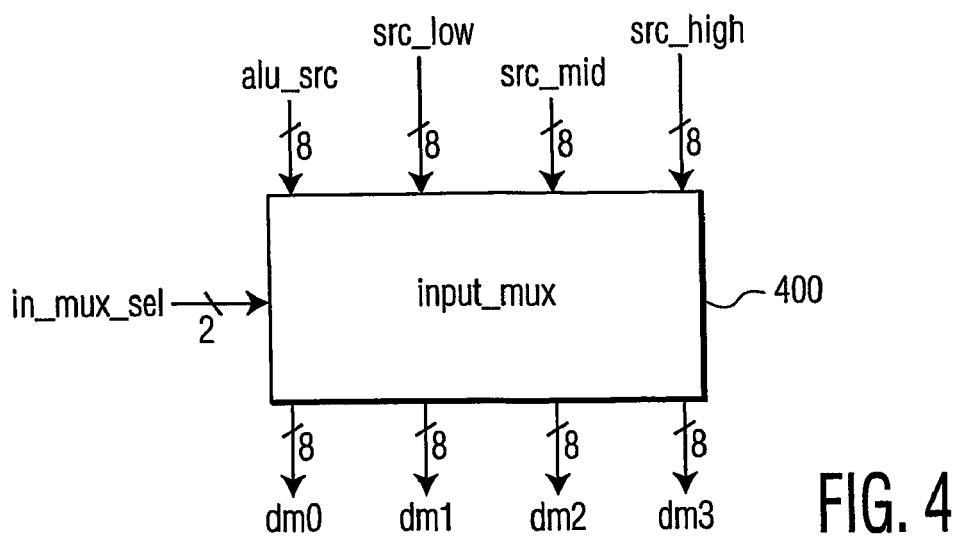
FIG. 4 illustrates an input MUX block, which is used to provide data signals, dm0 through dm3, to four ERAM blocks and to the four pointer register blocks.

FIG. 4 illustrates an input MUX block 400, which is used to provide data signals, dm0 through dm3, to the four ERAM blocks, 103a through 103d, and to the four pointer register blocks, 200a through 200d, Table 6 summarizes the input and output signals provided to and from the input MUX block 400.

TABLE 6

Summary of input and output signals provide to and from the input MUX block

| Name | Direction | Width | Function |
|---|---|---|---|
| alu_src | IN | 8 | ALU output data, used in standard 8-bit operations. |
| src_low | IN | 8 | The low byte of ed_uptr or acu_pc during universal pointer or stack operations. |
| src_mid | IN | 8 | The middle byte of ed_uptr or acu_pc during universal pointer or stack operations. |
| src_high | IN | 8 | The high byte of ed_uptr or acu_pc during universal pointer or stack operations. |
| in_mux_sel | IN | 2 | Controls the input data MUX. |
| dm0 | OUT | 8 | Data provided to eram0 and ptr_reg0. |
| dm1 | OUT | 8 | Data provided to eram1 and ptr_reg1. |
| dm2 | OUT | 8 | Data provided to eram2 and ptr_reg2. |
| dm3 | OUT | 8 | Data provided to eram3 and ptr_reg3. |

Data signals dm0, dm1, dm2 and dm3 are provided to the respective ERAM and pointer register blocks, as illustrated. The input MUX block 400 also performs manipulation of four input bytes, alu_src, src_low, src_mid, and src_high, for aligning these bytes into a predetermined byte alignment for use in a current instruction operation. For standard 8-bit operations, alu_src input signal is selected. The other input signals, src_low, src_mid, and src_high are provided to input ports of the input MUX block 400 for supporting pointer and stack operations. The alu_src input signal is provided from an arithmetic logic unit (not shown). An input data MUX control signal (in_mux_sel signal) is provided to an input port of the input MUX block from the control block 102 for selecting of whether data bits for the data signals dm0, dm1, dm2 and dm3 are to be selected from the alu_src input signal, or from the other input signals, src_low, src_mid, and src_high.

Figure 5:
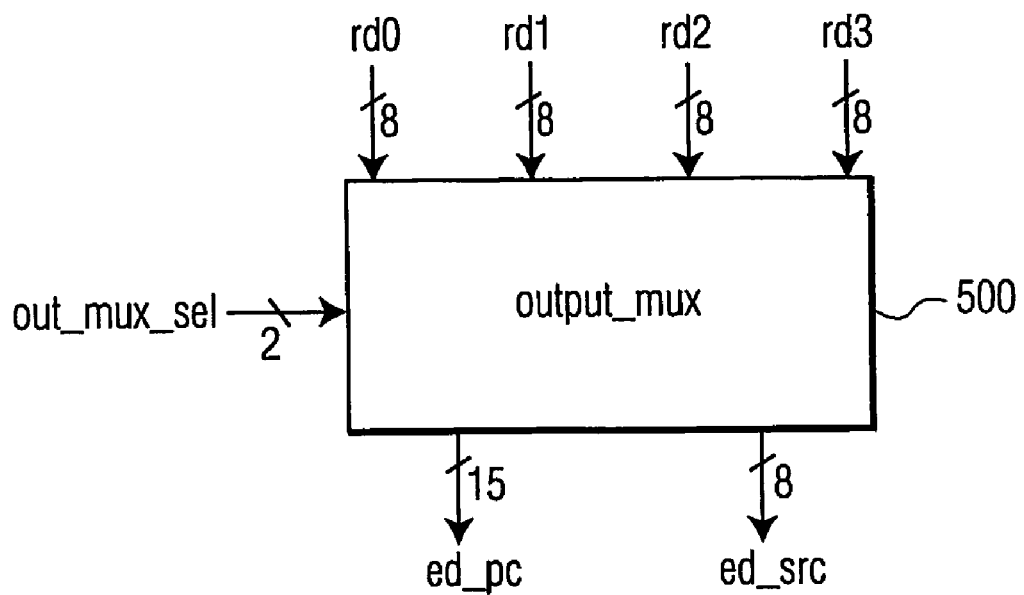
FIG. 5 illustrates an output MUX block, which is used to select data signals that are to be propagated from the output ports of the EDATA access logic block.

FIG. 5 illustrates an output MUX block 500, where this block selects values for a program counter (PC) that are to be propagated from the output ports 100a and 100b of the EDATA access logic block 100. The output MUX block performs an operation of rotating the 4 input bytes, rd0, rd1, rd2, and rd3, received from the respective ERAMs, into a predetermined alignment for a current operation of the EDATA access logic block 100. The input and output signals that are provided to and from the output MUX 500 are summarized in Table 7.

TABLE 7

Input and output signals provide to and from the output MUX block

| Name | Direction | Width | Function |
|---|---|---|---|
| rd0 | IN | 8 | Data from eram0. |
| rd1 | IN | 8 | Data from eram1. |
| rd2 | IN | 8 | Data from eram2. |
| rd3 | IN | 8 | Data from eram3. |
| out_mux_sel | IN | 2 | Controls the output data mux. |
| ed_pc | OUT | 15 | Provides the upper 15 bits of the PC value to be restored during a return instruction. |
| ed_src | OUT | 8 | Data read from the EDATA access logic block appears in this signal. It also provides the lower byte of the PC value to be restored during a return instruction. |

The control block 102 provides an output MUX control signal (out_mux_sel signal) to the output MUX 500, where this input signal provides the predetermined alignment of bytes for a current operation of the EDATA access logic block 100. Two output ports disposed on the output MUX provide a higher 15 data bits (ed_pc) and lower 8 data bits (ed_src) for the PC value for being restored during a return from interrupt instruction.

Figure 6:
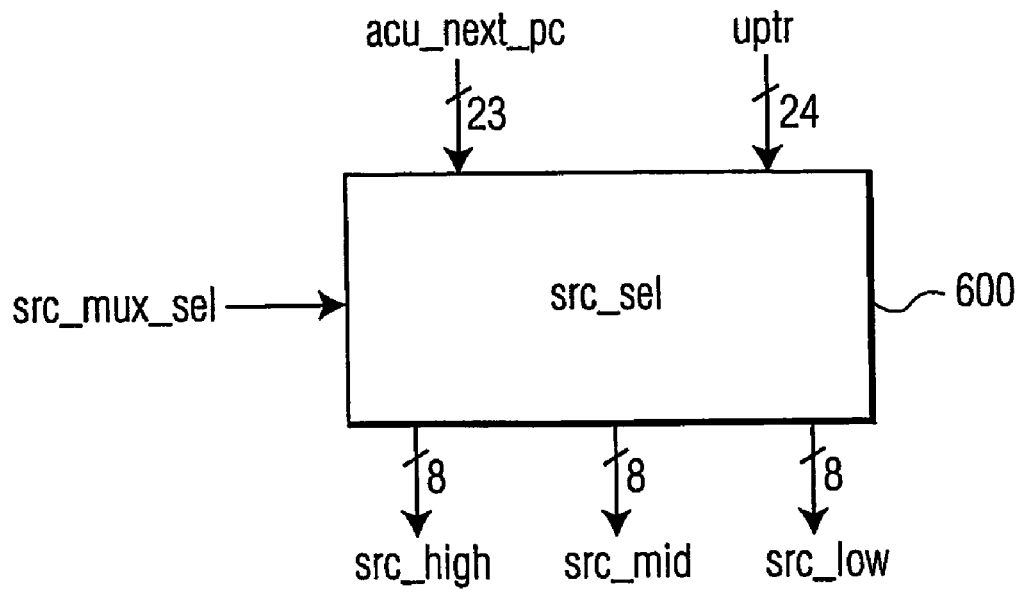
FIG. 6 illustrates a source select block, which is used to provide output signals to input ports of the input MUX; and, FIG. 7 outlines steps that are utilized for accessing of the pointer registers and of the pointer memory.

FIG. 6 illustrates a source select block 600, where the source select block has output ports for providing the src_high, src_mid and src_low output signals that are provided to input ports of the input MUX 400. A first input port disposed on the source select block 600 is for receiving a next program address derived from a current program counter value plus a length of a current instruction. A second input port disposed therein is for receiving a pointer target address for use during indirect access operations (ed_uptr signal). A selection signal (src_mux_sel signal) is provided to a third input port of the source select block 600 from the control block 102. The selection signal determines which of the src_high, src_mid and src_low output signals have data bits therein derived from the input signals received from at least one of the first and second input ports of the source select block 600. Input and output signals provided to and from the select block 600 are summarized in Table 8.

TABLE 8

Input and output signals provide to and from the source select block

| Name | Direction | Width | Function |
|---|---|---|---|
| acu_next_pc | IN | 23 | The next program address from the ACU (the current Program Counter contents plus the current instruction length). |
| ed_uptr | IN | 24 | Pointer target address during indirect operations. |
| src_mux_sel | IN | 1 | Selects input signals for the source MUX. |
| src_high | OUT | 8 | High byte output of the mux, either acu_pc or ed_uptr. |
| src_mid | OUT | 8 | Middle byte output of the mux, either acu_pc or ed_uptr. |
| src_low | OUT | 8 | Low byte output of the mux, either acu_pc or ed_uptr. |

Input signals provided to the ERAMs are summarized in Table 9, where these input signals are received from output ports disposed on the control circuit 102 and from the input MUX 400. A majority of these input signals are received from the control block 102, but the ed_dm0 through ed_dm3 input signal are received from the dm0 through dm3 output signals of the input MUX. 400. A clock, clk, input signal is also provided to the ERAMs 103.

In order to allow, single cycle operation with Pointer accesses, the area of memory that has stored therein the addresses used by the pointers is "shadowed." In shadowing, a duplicate memory is created using pointer registers, 200*a* through 200*d*, instead of using random-access memory components. Of course, just like with non-shadowed memory, before a pointer is used for memory or register access, prior initialization thereof is performed. Writing to the address of that pointer performs this initialization. In the process of writing to the memory address of the pointer, the pointer registers, 200*a* through 200*d*, are written to as well. Table 9 summarizes the input and output signals provided to the ERAMs.

TABLE 9

Input signals provided to the ERAMs

| Name | Direction | Width | Function |
|---|---|---|---|
| ed_ra0 | OUT | 14 | Address output to eram0. |
| ed_ra1 | OUT | 14 | Address output to eram1. |
| ed_ra2 | OUT | 14 | Address output to eram2. |
| ed_ra3 | OUT | 14 | Address output to eram3. |
| ed_ram_rd0_n | OUT | 1 | Read strobe for eram0. |
| ed_ram_rd1_n | OUT | 1 | Read strobe for eram1. |
| ed_ram_rd2_n | OUT | 1 | Read strobe for eram2. |
| ed_ram_rd3_n | OUT | 1 | Read strobe for eram3. |
| ed_ram_wr0_n | OUT | 1 | Write strobe for eram1. |
| ed_ram_wr1_n | OUT | 1 | Write strobe for eram1. |
| ed_ram_wr2_n | OUT | 1 | Write strobe for eram2. |
| ed_ram_wr3_n | OUT | 1 | Write strobe for eram3. |
| ed_dm0 | OUT | 8 | Data output to eram0. |
| ed_dm1 | OUT | 8 | Data output to eram1. |
| ed_dm2 | OUT | 8 | Data output to eram2. |
| ed_dm3 | OUT | 8 | Data output to eram3. |

Figure 7:
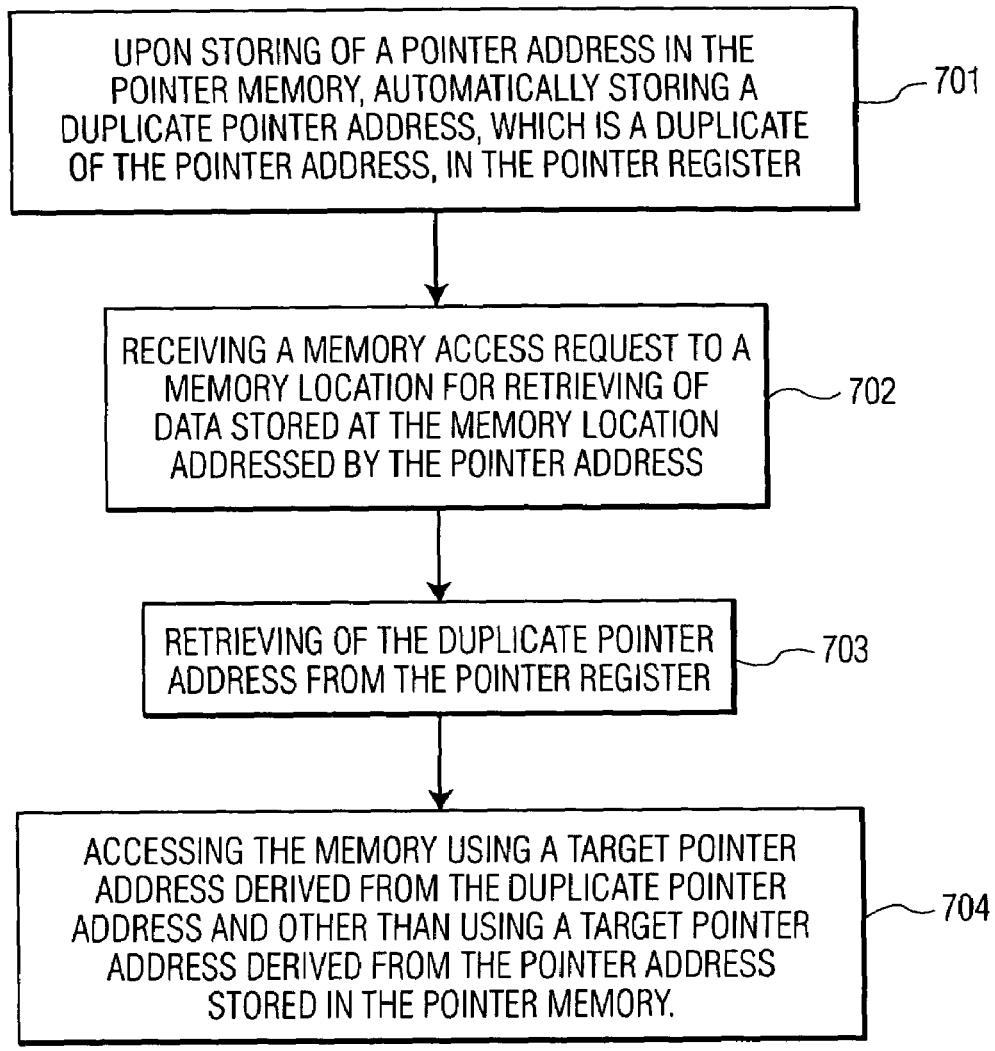

When a RAM access operation is performed to read the contents of a pointer stored in the pointer memory, it is the shadow memory implemented using the pointer registers, 200*a* through 200*d*, that is read and is used for returning of the pointer address data value stored therein. Referring to FIG. 7, upon storing of a pointer address in the pointer memory, a duplicate pointer address, which is a duplicate of the pointer address, is automatically stored in the pointer register, step 701. Since writing to memory locations reserved for pointer addresses results in corresponding pointer memory locations to be written to with the same data, coherency is always maintained between the pointer memory and the pointer registers. Of course, coherency is not maintained at power up when the pointers are uninitialized. Since the behavior of an uninitialized pointer is unpredictable, it is similar to that of an uninitialized location in pointer memory. In step 702, a memory access request to a memory location is received for retrieving of data stored at the memory location addressed by the pointer address. Thus, in step 703, the duplicate pointer address is retrieved from the pointer register, and in step 704, the random access memory is accessed using a target pointer address derived from the duplicate pointer address and other than using a target pointer address derived from the pointer address stored in the pointer memory.

Since the pointer registers are other than implemented in random access memory circuits, a pointer memory read operation involves multiplexing the appropriate value of a target pointer address from these pointer registers, where this target pointer address is then used for a read or write operation to the random access memory; This obviates a need for the overhead of two clock cycles. The savings in clock cycles is a result of register access being purely combinatorial and not utilizing clock and phase related timing, as is the case with access to the random access memory. Thus, combinatorial logic is implemented such that it enables the pointer multiplexer within the set-up time of the ERAM thereby saving a clock cycle and a memory access operation. The input MUX block 400 and the pointer MUX block 300 are not clock circuit gated, as is the ERAM, thus setup time of these circuits is not clock dependent. Since the pointer memory (ERAMs) are written to simultaneously as the pointer registers, the control circuit block provides sufficient setup time for pointer memories. The setup time allows for setting up of address bits to the pointer memories 103*a* through 103*d* and for ensuring that the pointer write addresses, dm0 through dm3 from the input MUX block 400 are valid before being written to the pointer registers 200*a* through 200*d* and to the pointer memories 103*a* through 103*d*.

The embodiment of the invention realizes "one-clock" operation, where instructions are executed in one clock cycle with the exception of instructions that require more than one program memory access, such as conditional branches. As a result of the predominant one-clock operation, cost savings are realized in end-user products since the power savings is directly proportional to clock frequency. Furthermore, a lower clock frequency provides lower electromagnetic interference (EMI), since EMI is proportional to clock frequency, thus requiring less system components. In addition, since products based on this family are intended to be produced using a 0.18 micron flash process, yield savings are realized from a resulting decrease in die size for a given set of features.

By shadowing of the memory regions of the ERAM, different length pointer operations are executable at any byte boundary. Pointer address generation logic circuitry disposed within the control block generates the appropriate address signals and strobe signals to perform memory access that is specified in a current instruction being executed by the processor. Typically, the instruction being executed involves an 8-bit, 16-bit, or 24-bit argument length. Additionally, single cycle read-modify write is supported by the EDATA access logic block 100, which allows the pointers registers to write back pointer data to their own storage locations as well as to the pointer memory ERAM.

Numerous other embodiments may be envisaged without departing from the spirit or scope of the invention.

The invention claimed is:

1. A microcontroller architecture comprising: a processor for processing of instruction data comprising memory access instructions for accessing of a memory circuit, the processor operating responsive to a clock circuit for providing clock cycles; at least a pointer memory circuit for storing of a pointer address forming part of the instruction data; at least a pointer register for storing a duplicate of the pointer address; a control circuit for determining whether one of a read operation from the at least a pointer memory circuit and a write operation to the at least a pointer memory circuit is to take place; wherein the clock circuit is coupled to the at least a memory circuit, the at least a pointer register and the control block, and the read operation accesses a region in the memory circuit that is addressed by a target pointer address within a single clock cycle or determining a read operation is to take place, and wherein for a write operation the control circuit stores the pointer address in the at least a pointer memory circuit and automatically stores a duplicate in the at least a pointer register and where for a read operation the control circuit utilizes the at least a pointer register to access data pointed to by the target pointer address derived from the pointer address stored therein without accessing the at least a pointer memory; the microcontroller architecture further comprising a pointer multiplexer block having at least an input port coupled to the at least a pointer register for receiving a pointer address and an output port for providing the target pointer address used for indirect addressing operations of data stored within the memory circuit; and a source select block having a first input port for receiving a next program address derived from a current program counter value plus a length of a current instruction, a second input port for receiving the target pointer address from the pointer multiplexer block, a third input port for receiving a selection signal from the control circuit for determining which data bits from the at least one of the input signals received at the first and second input ports are to be used for providing of pointer data output signals from output ports of the source select block.

2. A microcontroller architecture according to claim 1, wherein the at least a pointer register comprises a plurality of pointer registers, the microcontroller architecture comprising an input multiplexer having input ports coupled to the output ports of the source select block for receiving of the pointer data output signals therefrom, and for receiving of an input data multiplexer control signal from the control block, the input multiplexer control signal for determining which data bits derived from the pointer data output signals are to be used in forming of the pointer address for storage in the plurality of pointer registers.

3. A microcontroller architecture according to claim 2, wherein the at least a pointer memory circuit comprises a plurality of pointer memory circuits, the microcontroller architecture comprising an output multiplexer having input ports coupled to plurality of pointer memory circuits for receiving of data bits derived from the stored pointer address stored within the plurality of pointer memory circuits and having an output port for providing a program counter value for being restored during a return from interrupt instruction.

4. A microcontroller architecture according to claim 3, wherein the pointer multiplexer and the output multiplexer and the input multiplexer are not clock circuit gated.

5. For use with a processor responsive to clock cycles, a method of pointer based addressing comprising the steps of: providing at least a pointer memory; providing at least a pointer register; storing of a pointer address data in the at least a pointer memory; upon storing of a pointer address data in the at least a pointer memory, automatically storing a duplicate pointer address data, which is a duplicate of the pointer address data, in the at least a pointer register; receiving a memory access request to a memory location within a memory for retrieving of data stored at the memory location addressed by the pointer address; retrieving the duplicate pointer address data from the pointer register; accessing the memory using a target pointer address derived from the duplicate pointer address data without using a target pointer address derived from the pointer address data stored in the at least a pointer memory, wherein the steps of retrieving and accessing occur within one clock cycle of the step of receiving; and writing back the target pointer address to the at least a pointer register and to the at least a pointer memory.

6. A method according to claim 5, wherein the step of automatically storing is performed within a same clock cycle as the step of storing.

7. A method according to claim 5, wherein the step of automatically storing is performed after the step of storing such that the at least a pointer memory is not accessible by other operations until the step of automatically storing is completed.

8. A method according to claim 5 comprising the step of detecting all changes to the at least a pointer memory for automatically storing the duplicate pointer address data.

9. A method according to claim 5, comprising the step of detecting all changes to the at least a pointer memory for automatic ally storing the duplicate pointer address data.

10. A method according to claim 5, wherein the at least a pointer register comprises a plurality of pointer registers, wherein the step of accessing comprises the step of multiplexing of the pointer address data stored in the plurality of pointer registers to form the target pointer address for accessing of the random access memory.

* * * * *